US005764384A

United States Patent [19]
Wilcox et al.

[11] Patent Number: 5,764,384
[45] Date of Patent: Jun. 9, 1998

[54] INTEGRATED CHASSIS FOR AUTOMATIC DOCUMENT FEEDER IN A SCANNING UNIT

[75] Inventors: Darren W. Wilcox; Alpha N. Doan; Dennis Sonnenburg, all of San Diego, Calif.

[73] Assignee: Hewlett-Packard Company, Palo Alto, Calif.

[21] Appl. No.: 324,820

[22] Filed: Oct. 17, 1994

[51] Int. Cl.⁶ .................................................. H04N 1/04
[52] U.S. Cl. .......................... 358/498; 358/496; 358/400; 271/4.1; 271/10.11; 271/121
[58] Field of Search .................................. 358/498, 496, 358/474, 400, 401; 361/212, 214, 220; 271/4.1, 10.11, 109, 121

[56] References Cited

U.S. PATENT DOCUMENTS

| | | | |
|---|---|---|---|
| 3,661,383 | 5/1972 | Morrison | 271/273 |
| 4,300,169 | 11/1981 | Sato | 358/496 |
| 4,474,365 | 10/1984 | DiBlasio | 271/3.2 |
| 4,494,166 | 1/1985 | Billings et al. | 361/214 |
| 4,809,126 | 2/1989 | Burkman et al. | 361/220 |
| 4,854,757 | 8/1989 | Kikuchi | 271/3.14 |
| 4,970,606 | 11/1990 | Shima | 358/474 |
| 5,267,059 | 11/1993 | Kawabata et al. | 358/474 |
| 5,335,137 | 8/1994 | English et al. | 361/212 |
| 5,353,360 | 10/1994 | Obara | 358/496 |
| 5,412,462 | 5/1995 | Matsuo et al. | 271/4.08 |

*Primary Examiner*—Thomas D. Lee
*Attorney, Agent, or Firm*—David S. Romney

[57] ABSTRACT

In a scanning unit such as a facsimile machine, an automatic document feeder transports individual sheets from a stack of documents along a document path over a scanning window to an output tray. An upper guide member includes an integrated chassis which provides most of the functional features required for picking individual sheets from a stack of documents in an input tray and transporting the sheet past a scanning window. The various components incorporated in the integrated chassis include a document separation mechanism, pre-scanning pinch rollers, post-scanning pinch rollers, a spring-loaded limiter with minimal paper path obstruction, a hinging mechanism to facilitate manual access to the document path, a latching mechanism, referencing datums, and ESD grounding including ESD brushes adjacent the document path and an ESD shield for a circuit board housed in the upper guide member. In the preferred form, the integrated chassis is formed from an enlarged sheet metal plate which attaches to the underside of a manual control/display panel with the circuit board sandwiched therebetween.

20 Claims, 14 Drawing Sheets

INTEGRATED CHASSIS FOR AUTOMATIC DOCUMENT FEEDER IN A SCANNING UNIT

CROSS-REFERENCE TO RELATED APPLICATIONS

This application relates to the subject matter disclosed in the following co-pending U.S. applications:

U.S. application filed Oct. 14, 1994 entitled "Paper Separator Spring Assembly For Facsimile Or Copy Maching" attorney docket number 1094915-1; and U.S. application filed Oct. 14, 1994 entitled "Paper Picking And Separator System For Facsimile Or Copy Machine", attorney docket number 1094908-1; and U.S. application filed Oct. 14, 1994 entitled "Stripper roller Manufacturing Method", attorney docket number 1094929-1; and U.S. application filed Oct. 14, 1994 entitled "Asymmetrical paper Separator Roller for Facsimile Or Copy Machine", attorney docket number 1094907-1; and U.S. application filed herewith, entitled "Precision Referencing/Latching System For Document Separation And Transport In A Scanning Unit", attorney docket number 1094954-1; and U.S. application filed herewith, entitled "A Scanning Unit With Independent Spring-Loaded document Control Components Mounted On An Integrated Chassis", attorney docket number 10941012-1.

The above co-pending applications are assigned to the present assignee and are incorporated herein by reference.

BACKGROUND OF THE INVENTION

This case relates generally to document feeders for picking sheets of documents already having data thereon, and more particularly to scanning units in a facsimile machine.

Prior art scanning units have typically had a myriad of parts making up the document path. This has typically resulted in complicated referencing between adjoining parts which produces larger tolerance variations. Accordingly, misfeeds often occur, and the quality of scanning is often unsatisfactory, thereby resulting in bad outputs such as at a facsimile receiver.

Prior solutions have failed to adequately deal with the problem, and the multiple parts have required more intervention during assembly of the products, and greater paper path disruption, as well as imprecise referencing between elements on a rigid frame and matching elements on an upper document guide which is typically move between a closed scanning position and an open position to allow manual accessibility.

What is needed is a document picking and transport system which provides the advantages of improved reliability and output quality due to decreased assembly time and intervention, decreased part count, decreased interruption of the document path, and improved document control while scanning.

BRIEF SUMMARY OF THE INVENTION

In a scanning unit such as a facsimile machine, an automatic document feeder transports individual sheets from a stack of documents along a document path over a scanning window to an output tray. An upper guide member includes an integrated chassis which provides most of the functional features required for picking individual sheets from a stack of documents in an input tray and transporting the sheet past a scanning window. The various components incorporated in the integrated chassis include a document separation mechanism, pre-scanning pinch rollers, post-scanning pinch rollers, a spring-loaded limiter with minimal paper path obstruction, a hinging mechanism to facilitate manual access to the document path, a latching mechanism, referencing datums, and ESD grounding including ESD elements adjacent the document path and an ESD shield for a circuit board housed in the upper guide member. In the preferred form, the integrated chassis is formed from an enlarged sheet metal plate which attaches to the underside of a manual control/display panel with the circuit board sandwiched therebetween, which moves from a closed position during feeding, transporting and scanning to an open position for removing any paper jams in the document path, and for maintenance on the scanner such as cleaning the scanning window and the whitened surface on the limiter.

DETAILED DESCRIPTION OF THE PREFERRED EMBODIMENTS

Figure 1:
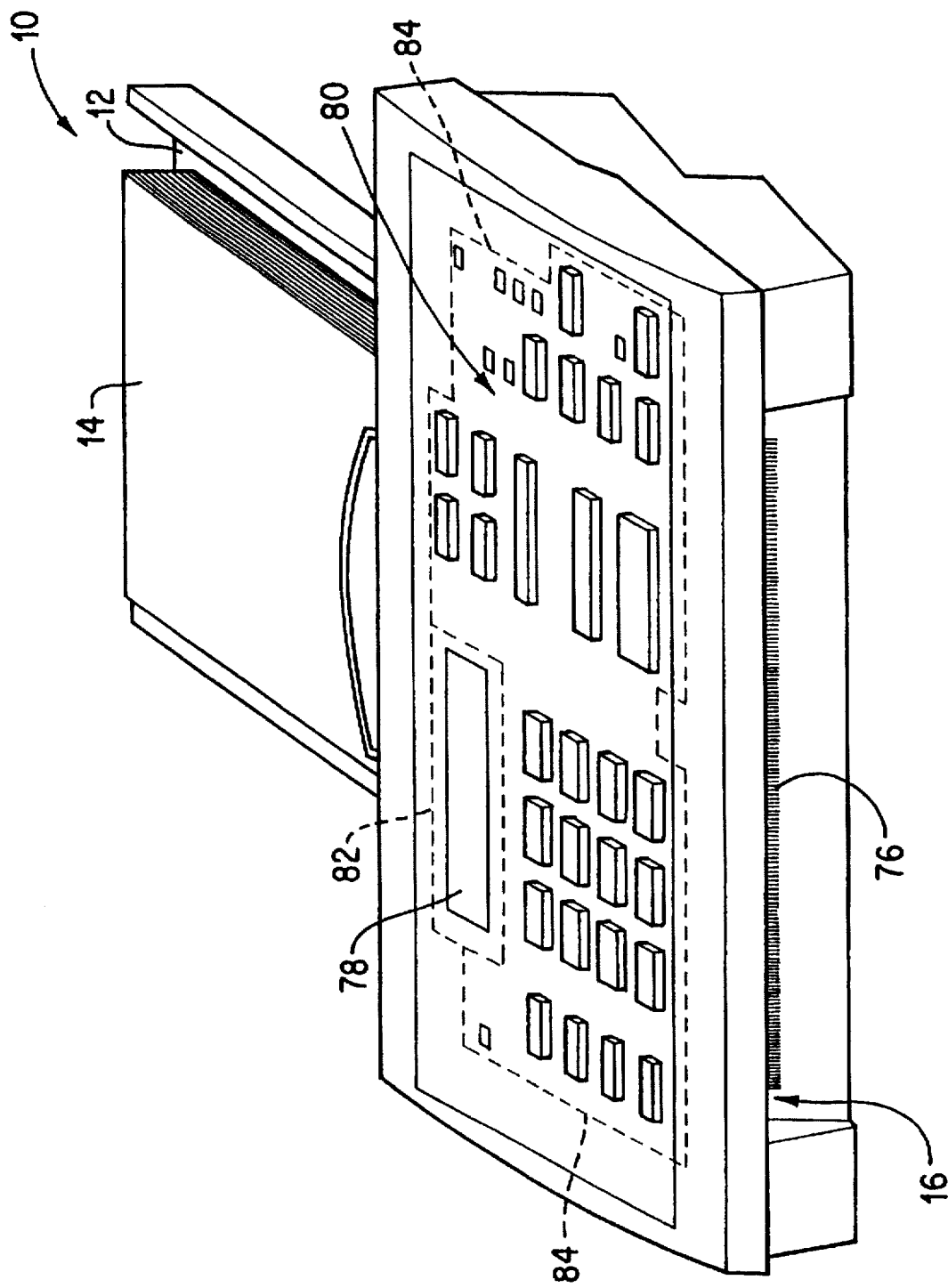
FIG. 1 is a top perspective view of a facsimile machine incorporating a presently preferred embodiment of the invention.

Generally speaking, the invention includes a scanning unit such as a facsimile machine, an automatic document feeder transports individual sheets from a stack of documents along a document path over a scanning window to an output tray. An upper guide member includes an integrated chassis which provides most of the functional features required for picking individual sheets from a stack of documents in an input tray and transporting the sheet past a scanning window. The various components incorporated in the integrated chassis include a document separation mechanism, pre-scanning pinch rollers, post-scanning pinch rollers, a spring-loaded limiter with minimal paper path obstruction, a hinging mechanism to facilitate manual access to the document path, a latching mechanism, referencing datums, and ESD grounding including ESD brushes adjacent the document path and an ESD shield for a circuit board housed in the upper guide member. In the preferred form, the integrated chassis is formed from an enlarged sheet metal plate which attaches to the underside of a manual control/display panel with the circuit board sandwiched therebetween. In that regard, the invention is best understood in connection with the illustrated embodiments shown in the drawings, as described in more detail below.

FIG. 1 is a front perspective view of a facsimile machine 10 incorporating the preferred embodiment paper separator mechanism. Facsimile machine 10 contains a paper tray 12 which slopes downward so that a paper stack 14 placed into tray 12 is urged toward the receiving portion of machine 10 by gravity. The paper stack 14 enters a slot in the back of machine 10.

A paper separation mechanism within machine 10 pulls one sheet of paper at a time from the bottom of the stack 14 so that printing on the sheet may be read and subsequently transmitted by the facsimile machine 10 in a well known manner. The sheet may also be copied by machine 10. In another embodiment, machine 10 is a printer which feeds in blank sheets of paper for printing thereon. The individual sheets of paper are then outputted through exit slot 16.

A printing mechanism (not shown) is also provided in the complete machine 10 for printing received facsimile transmissions. The printing mechanism, which may be an inkjet or laser printer, can also be used when machine 10 is used as a copier or printer.

Figure 2:
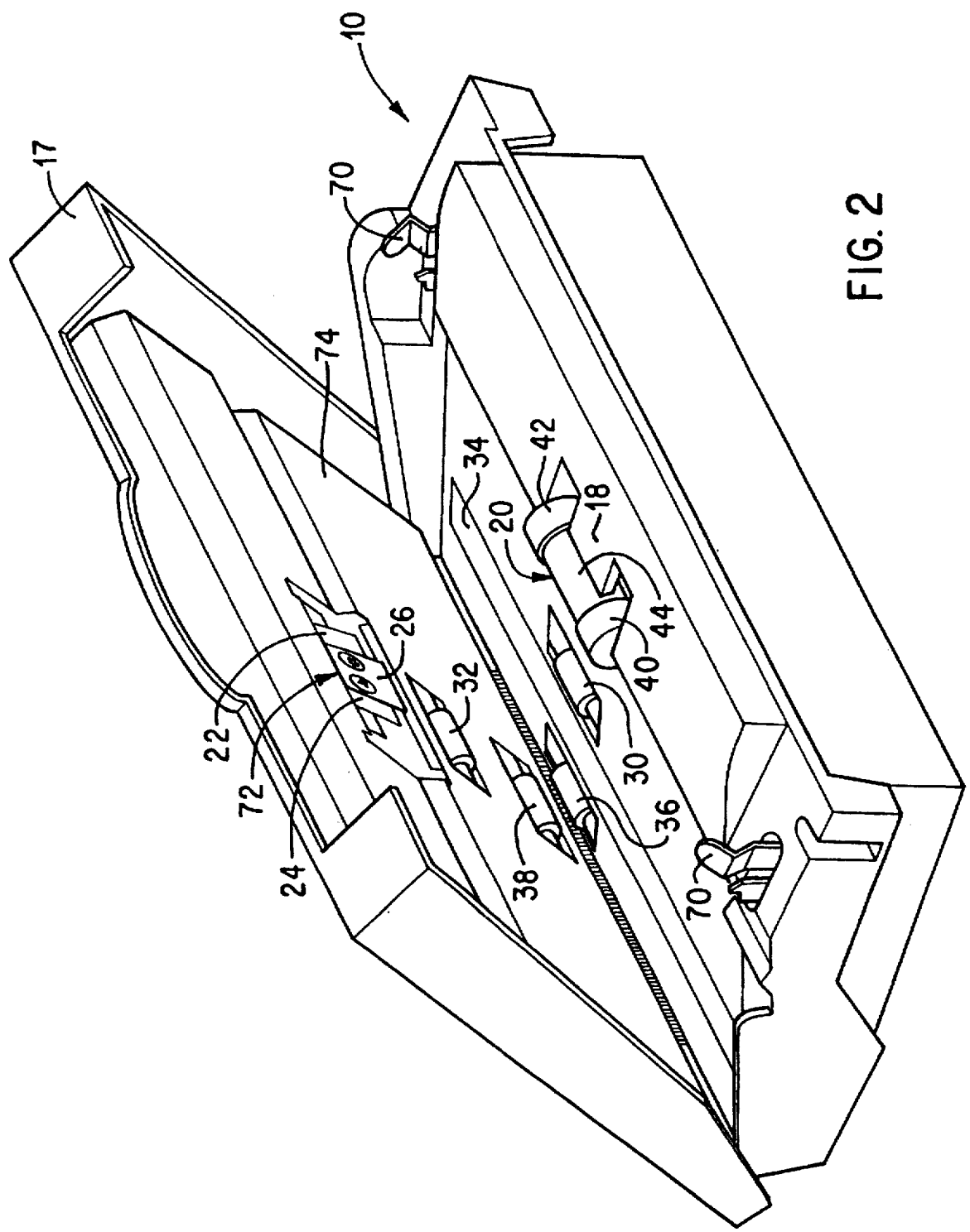
FIG. 2 is a back perspective view of the machine of FIG. 1 with its upper automatic document guide in open position exposing the document path past a scanning station.

FIG. 2 is a back perspective view of the facsimile machine 10 with its hinged top portion 17 lifted up to reveal the paper separation and paper transport mechanisms. Paper feed tray 12 has been removed in FIG. 2 for simplicity. When top portion 17 is in its closed position, shown in FIG. 1, and paper stack 14 is placed in paper tray 12, the front edge of the stack extending over shelf 18 abuts against a rubber or rubber-like stripper roller 20, and paper-feed springs 22 and 24 provide a downward force on paper stack 14.

When stripper roller 20 rotates, the frictional force between roller 20 and the bottom sheet, and the frictional forces between the bottom sheet and the overlying sheets, pull the paper sheets further into machine 10. A rubber separator pad 26, biased downward by a separator spring 27 (obscured in FIG. 2), effectively blocks all sheets but the bottom sheet so that only the bottom sheet directly contacted by the rubber-like stripper roller 20 is forwarded past separator pad 26.

In one embodiment the average forwarding speed of stripper roller 20 is about 12 mm/sec.

A downstream, rubber or rubber-like main feed roller 30 is rotated so as to have a faster paper forwarding speed (e.g., 26 mm/sec.) than stripper roller 20. Thus, when the bottom sheet of paper is sufficiently forwarded by stripper roller 20 to be between main feed roller 30 and an opposing passive roller 32, the bottom sheet will be pulled by main feed roller 30 (rather than pushed by stripper roller 20) to ensure that the paper speed is constant and correct across window 34 or any printing mechanism. Stripper roller 20 is driven via a slip clutch, which allows stripper roller 20 to rotate at the increased forwarding speed of main feed roller 30 when a single sheet of paper simultaneously contacts both rollers 20 and 30.

Main feed roller 30 forwards the paper over a window 34, below which resides the necessary optical detection electronics for detecting the printing on the bottom sheet. Such optical electronics can be conventional and will not be described in detail herein. If machine 10 were solely a printer, window 34 and the optical electronics may be replaced by a printing mechanism.

A rubber or rubber-like kick-out roller 36, in conjunction with a passive opposing roller 38, has a 2% faster forwarding speed than main feed roller 30 to ensure that there is no slack in the paper between rollers 30 and 36. The pulling force of main feed roller 30 is approximately 3 pounds, while the pulling force of kick-out roller 36 is approximately 1.5 pounds, so the speed of the paper is controlled by main feed roller 30 rather than kick-out roller 36.

A single stepper motor drives each of the rollers 20, 30, and 36, and gear mechanisms and slip clutch mechanisms are used for driving rollers 20, 30, and 36 at the required rotational speeds and forces.

The users of the facsimile machine 10, when placing the paper stack 14 in position on tray 12, will insert the stack 14 into machine 10 with varying amounts of force depending upon what tactile feedback the user believes is required to indicate a proper positioning of the stack. If the expected tactile feedback force is very light, then no sheets may be grabbed by the rotating stripper roller 20, since there is insufficient friction between roller 20 and the bottom sheet. If the user expects a high degree of tactile feedback, the stack 14 will be wedged deeply between stripper roller 20 and the opposing springs 22, 24, and 27, thus possibly causing multiple sheets to be simultaneously forwarded downstream by stripper roller 20.

The below-described stripper roller 20 and opposing spring assembly (comprising springs 22, 24, and 27 and separator pad 26) improve the separating function of the stripper mechanism to compensate for the varying forces initially exerted on the paper stack 14 when the user inserts the stack 14 into machine 10.

Figure 3:
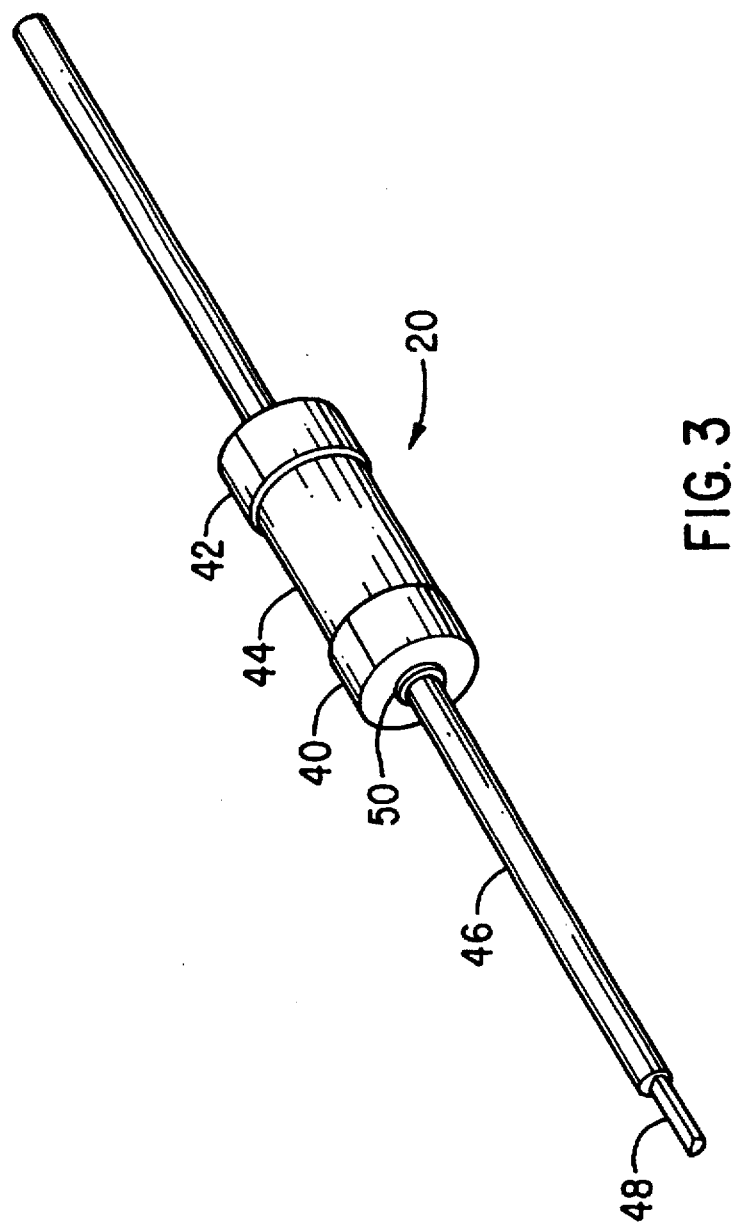
FIG. 3 is a presently preferred stripper or pick roller.

FIG. 3 is a perspective view of the preferred embodiment stripper roller 20. Stripper roller 20 includes eccentric kicker portions 40 and 42 located at the ends of the cylindrical middle portion 44 (also identified in FIG. 2). Stripper roller 20 is forcedly slipped over a stainless steel shaft 46 and is frictionally secured to shaft 46. Shaft 46 includes a flattened end 48 which is ultimately secured to a suitable slip clutch and gear mechanism within facsimile machine 10 for rotating stripper roller 20. A molded plastic shim 50 is attached to shaft 46 and includes an extension which is inserted under kicker portion 40 to create the eccentricity of kicker portion 40. An identical shim 51 is used to create the eccentricity of kicker portion 42.

Figure 4:
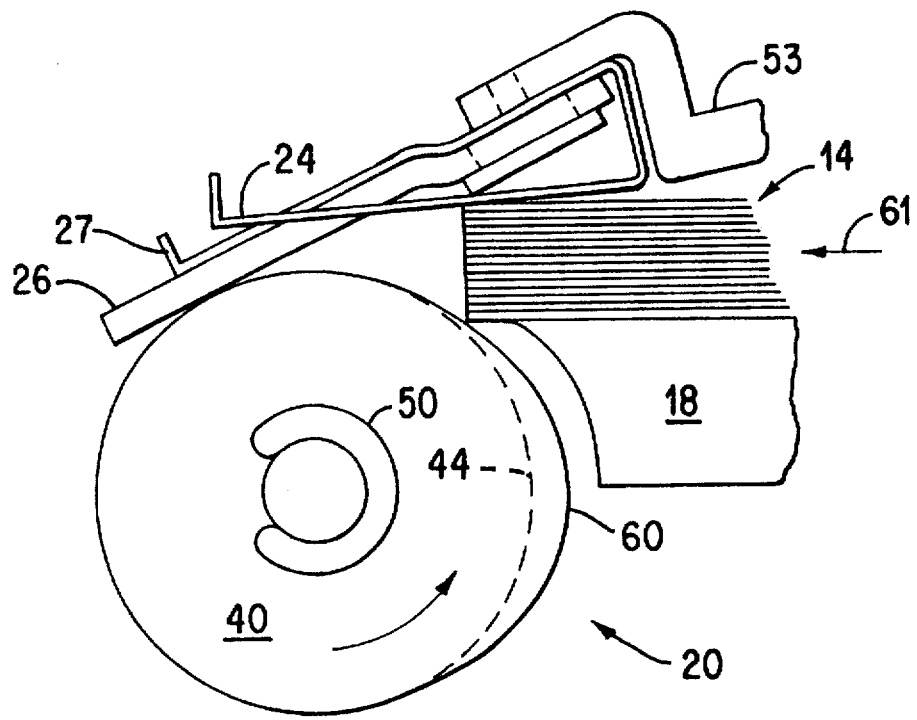
FIGS. 4 and 5 are side view illustrating the dynamic action of the pick roller of FIG. 3 and a presently preferred separator assembly which together enable individual document sheets to be picked one by one from a stack.
Figure 5:
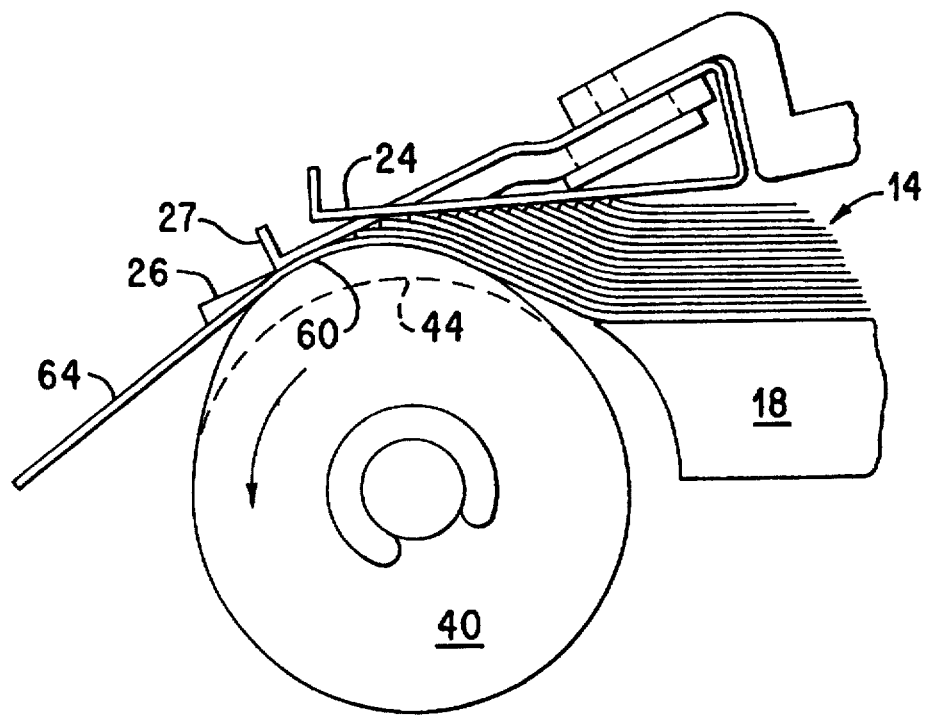
Figure 10:
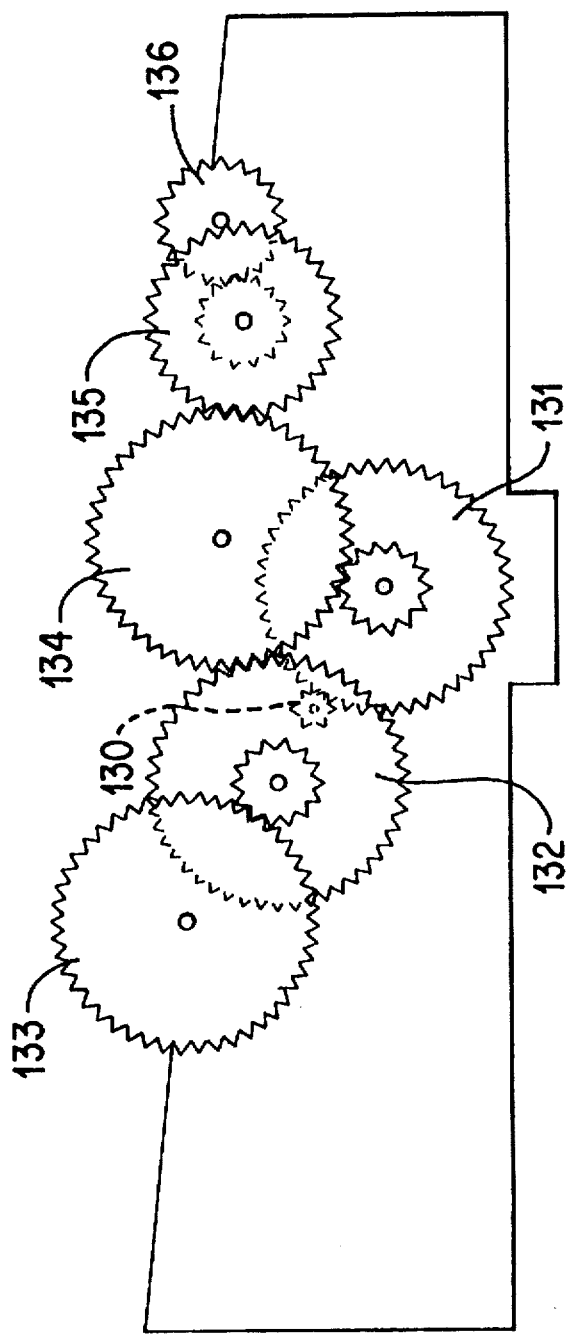
FIG. 10 is a side view of the frame portion of FIG. 7 showing the transfer gears from a motor to the pick roller, pre-scanning primary drive roller and post-scanning (kickout) secondary drive roller.

FIGS. 4 and 5 illustrate the operation of the eccentric kicker portions 40 and 42 as the apex 60 makes a first revolution after a paper stack 14 is inserted into the facsimile machine 10. In FIG. 10, a user inserts a paper stack 14 in the direction shown by arrow 61 between paper-feed springs 22/24 and kicker portions 40/42 of roller 20. The user senses the resistance to further insertion of the paper stack 14 and releases the paper stack 14. The actual extent to which the paper stack 14 is inserted between roller 20 and paper-feed springs 22/24 thus varies depending upon the user.

As the apex 60 is rotated toward the paper stack 14, the downward force applied by paper-feed springs 22/24 is thus increased (causing the friction between the kicker portions 40/42 and the bottom paper sheet to be increased). At the same time, the apex 60 of kicker portions 40/42 effectively reaches out to contact a greater bottom surface area of the bottom paper sheet so that the bottom sheet is pulled forward by the direct frictional contact with the kicker portions 40/42, while the other sheets are pulled forward with less force by their friction with this bottom sheet. The downward angle of paper-feed springs 22/24 causes the paper stack 14 to spread forward to resemble a staircase (FIG. 5), while the bottom sheet or bottom few sheets continue to be carried forward by the high friction between the kicker portions 40/42 and the bottom sheet.

FIG. 5 illustrates the position of stack 14 after being carried forward during the first rotation of stripper roller 20 at the point where apex 60 has now completed its function and advanced the bottom sheet 64 or bottom few sheets to be in contact with the rubber separator pad 26. During this next stage, the friction between the bottom sheet 64 and the rotating roller 20 continues to push the bottom sheet 64 out from under separator pad 26, while the sheets overlying this bottom sheet 64 are held back by contact with separator pad 26 and slip with respect to the bottom sheet 64.

After the bottom sheet 64 has exited from between separator pad 26 and stripper roller 20, the next sheet comes in direct contact with the rubber or rubber-like surface of the stripper roller 20 and is thus forced under the separator pad 26, while the separator pad 26, in conjunction with the angled paper-feed springs 22 and 24, hold back the remainder of the sheets.

Once the bottom sheet being passed under separator pad 26 reaches the main feed roller 30 shown in FIG. 2, then the main feed roller 30 controls the forwarding of the bottom sheet, as previously described with respect to FIG. 2.

Referring back to FIGS. 1–2, it will be understood that top portion 17 generally constitutes an upper guide member which is held in a closed position during scanning by a pair of upstanding spring latches 70/71. The various document control components previously described including a composite separator assembly 72, and the passive rollers 32/38 are mounted in a rigid chassis 74 preferably made of sheet metal. Also directly mounted on the chassis are electrostatic discharge devices (ESD) such as conductive brushes 76 located adjacent the document path exit 16. The preferred embodiment provides a display window 78 on a display/control panel 80 which have respective circuit board components 82/84 shown by dotted lines which are sandwiched against the chassis 74. A ground plate (not shown) framing the display panel is directly grounded to the metallic chassis which also acts as a shield to protect the circuit board elements from damage by ESD. The chassis is grounded to the frame by a separate ground wire (not shown) and also through a metallic pivot hinge to be described hereinafter.

Figure 6:
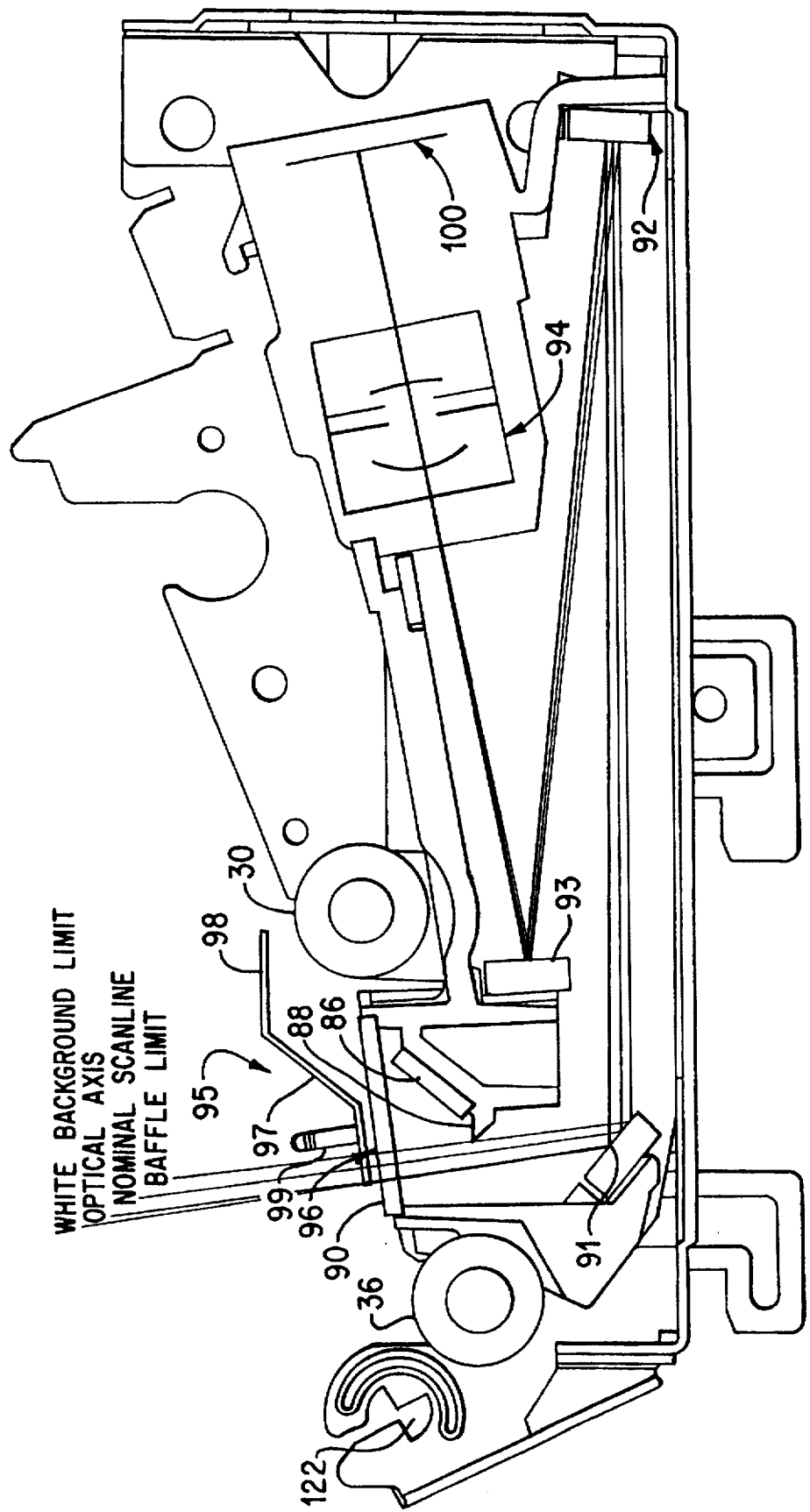
FIG. 6 is a side cut-away view of the scanner unit of the facsimile machine of FIG. 1.

The details of the scanner are best shown in FIG. 6, including a LED illumination array 86, an opaque baffle 88, a transparent scanning window 90, and mirrors 91/92/93 which transfer the optical signals from a document being scanned through a lens 94 to a CCD array 100. A limiter 95 having level portion 96, angled portion 97, lever arms 98, and mounting fingers 99 is spring biased to press a document somewhat tightly out of its normal position between the two drive rollers to a predetermined location in close proximity but preferably not touching the scanning window. The angled portion helps guide the document without obstructing the document path. A white background for calibration purposes is provided on bottom surfaces of the level and angled portions 96/97, such as Kimdura plasticized paper which is specialized optical material having suitable optical characteristics as well as suitable durability during normal use and cleaning. The limiter is spring loaded to exert a force of at least 1/10 of a pound (approximately 0.5 newtons) in order to overcome any counterbalancing from the document sheet. In reality, the actual spring force used is about five times that minimum amount to avoid the need for precise tolerances during manufacturing.

In order to achieve the proper picking and transporting of document sheets past the scanning window, the following preferred specifications have been used for the driven rollers:

TABLE I

|  | diameter | hardness | doc. speed | spr. force |
| --- | --- | --- | --- | --- |
| PickRoller | 19 mm | 30 shoreA | 12.7 mm/sec | N/A |
| PreScanRoller | 12.7 mm | 50 shoreA | 25.9 mm/sec | 2 × 1.6 lbs |
| PostScanRoller | 12.9 mm | 50 shoreA | 26.3 mm/sec | 2 × 1.8 lbs |

Figure 7:
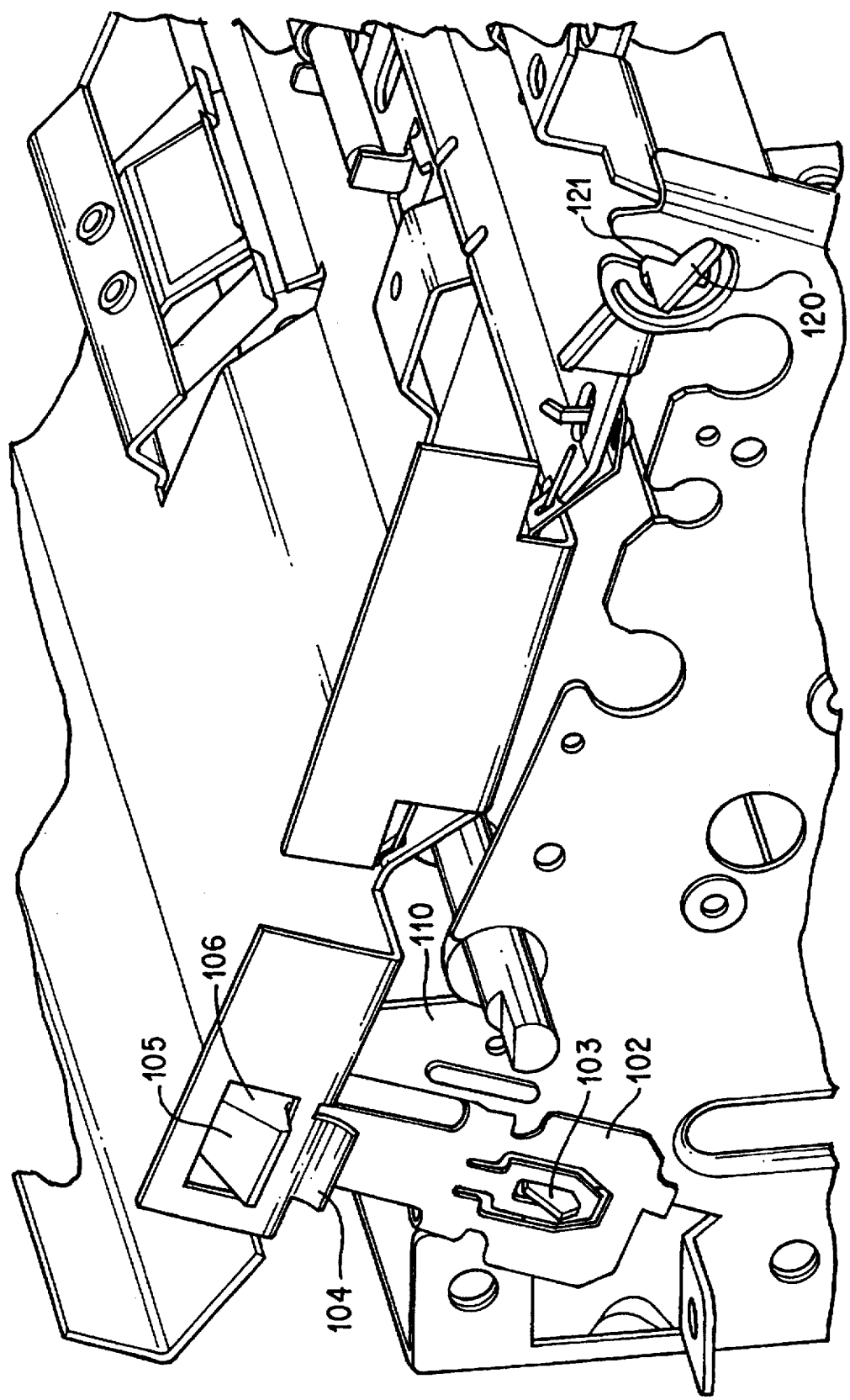
FIG. 7 is a partial isometric view of a chassis portion of an upper guide member in closed position on a frame.
Figure 8:
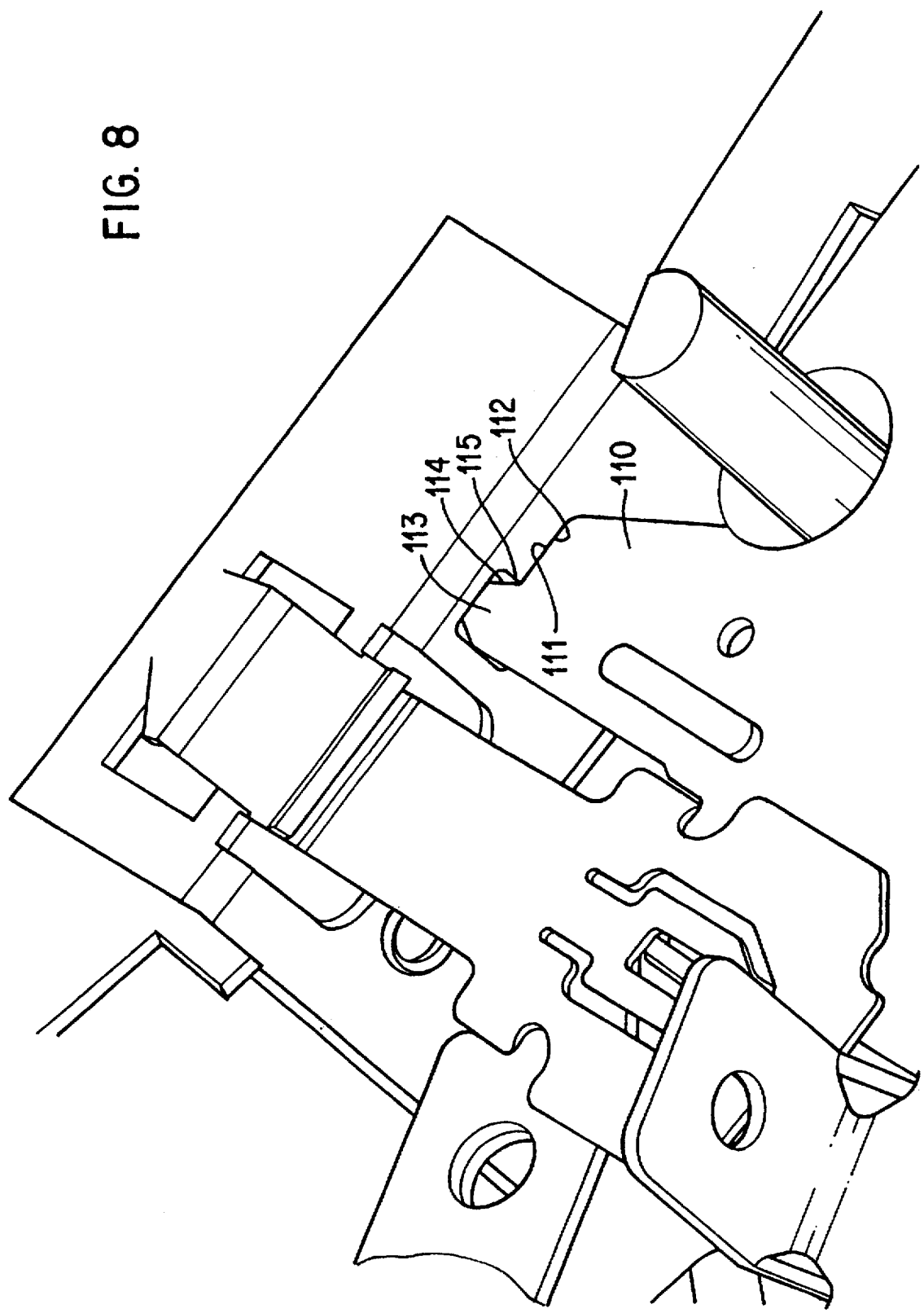
FIG. 8 is an enlarged fragmentary view of FIG. 7 looking up at the latching mechanism and certain reference datums.
Figure 9:
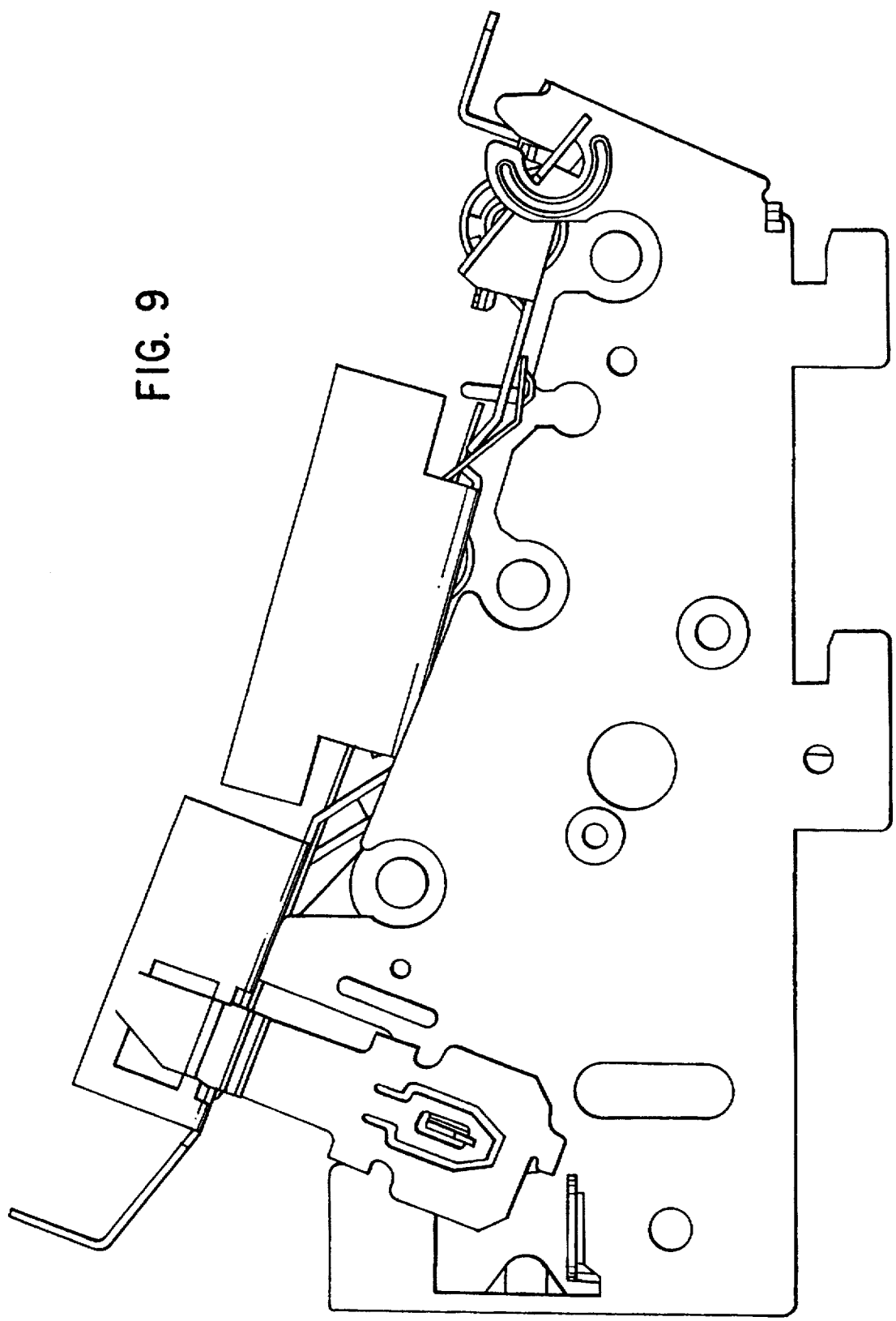
FIG. 9 is a complete side view of FIG. 7.

FIGS. 7–9 show the details of the pivotal hinging, as well as the referencing and latching between the chassis of the upper guide member and the frame. The latch spring mechanism includes a base 102, a frame mounting pin 103, chassis lip 104, a V-shaped spring extension 105, and a chassis aperture 106. An upstanding arm 110 has a shoulder surface 111 which engages a Z-datum surface 112 on the chassis. This latter datum surface 112 on the rigid chassis 74 (FIG. 2) interacts with a matching position datum, namely the shoulder surface 111, on the frame 10 to help the picking to be successful. More specifically this pair of datum surfaces 111, 112 helps to achieve a predetermined distance between the chassis 74 and frame 10 when the upper guide member 17 is in its closed position. The arm 110 also has a tapered tongue 113 with a reference edge 114 to engage a reference seat 115 on the chassis and a non-reference edge which preferably has a slight clearance relative to the reference seat. The seat 115, too, on the rigid chassis 74 interacts with a matching reference edge 114, on the frame 10 to help the picking to be successful. In this case, it helps to achieve a predetermined location of the chassis 74 and upper guide member 17 in relation to the lower frame 10, along the document-feed direction, when the upper guide member 17 is in its closed position. Both of the V-shaped spring extensions push outwardly, as well as downwardly to securely engage the reference surfaces. These spring extensions 105 (and the mating surfaces 104), too, interacting to help the picking to be successful by helping to achieve a predetermined location (in this instance along the direction transverse to the document-feed path) of chassis 74 to frame 10 when the upper guide 17 is closed.

Figure 13:
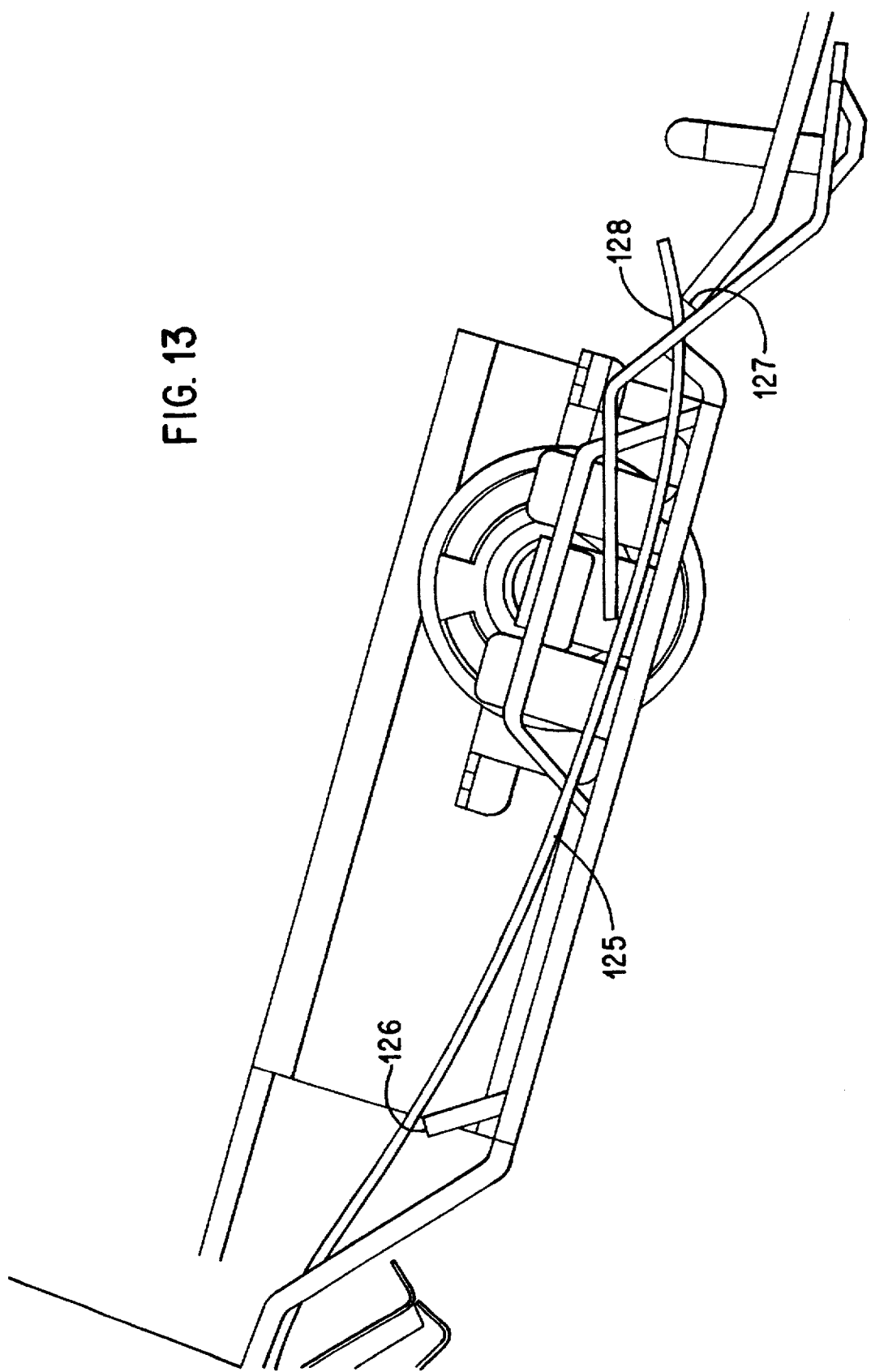
FIG. 13 is an enlarged fragmentary view of FIG. 12 showing a spring-biased limiter.

Each pivotal arm 120 on the chassis potentially abuts a downwardly facing secondary datum 121 as it moves between open and closed positions in a pivoting slot 122 in the frame. The arm 120 and datum 121 constitute still another pair of surfaces that interact to help the picking be successful by helping to achieve a predetermined distance between the chassis 74 and frame 10 when the upper guide 17 is closed. A wire spring 125 is suspended between two bridge elements 126, 127 and passes through an aperture 128 and around the end of the lever arm of the limiter to provide the aforementioned spring biasing (see FIG. 13).

FIG. 10 shows the gear train going from a motor shaft 130 through first and second transfer gears 131/132 to pick roller gear 133, through first transfer gear 131 to pre-scanning roller gear 134, and through third transfer gear 135 to post-scanning roller gear 136. The holes for the gear shafts are respectively shown in FIG. 9.

Figure 11:
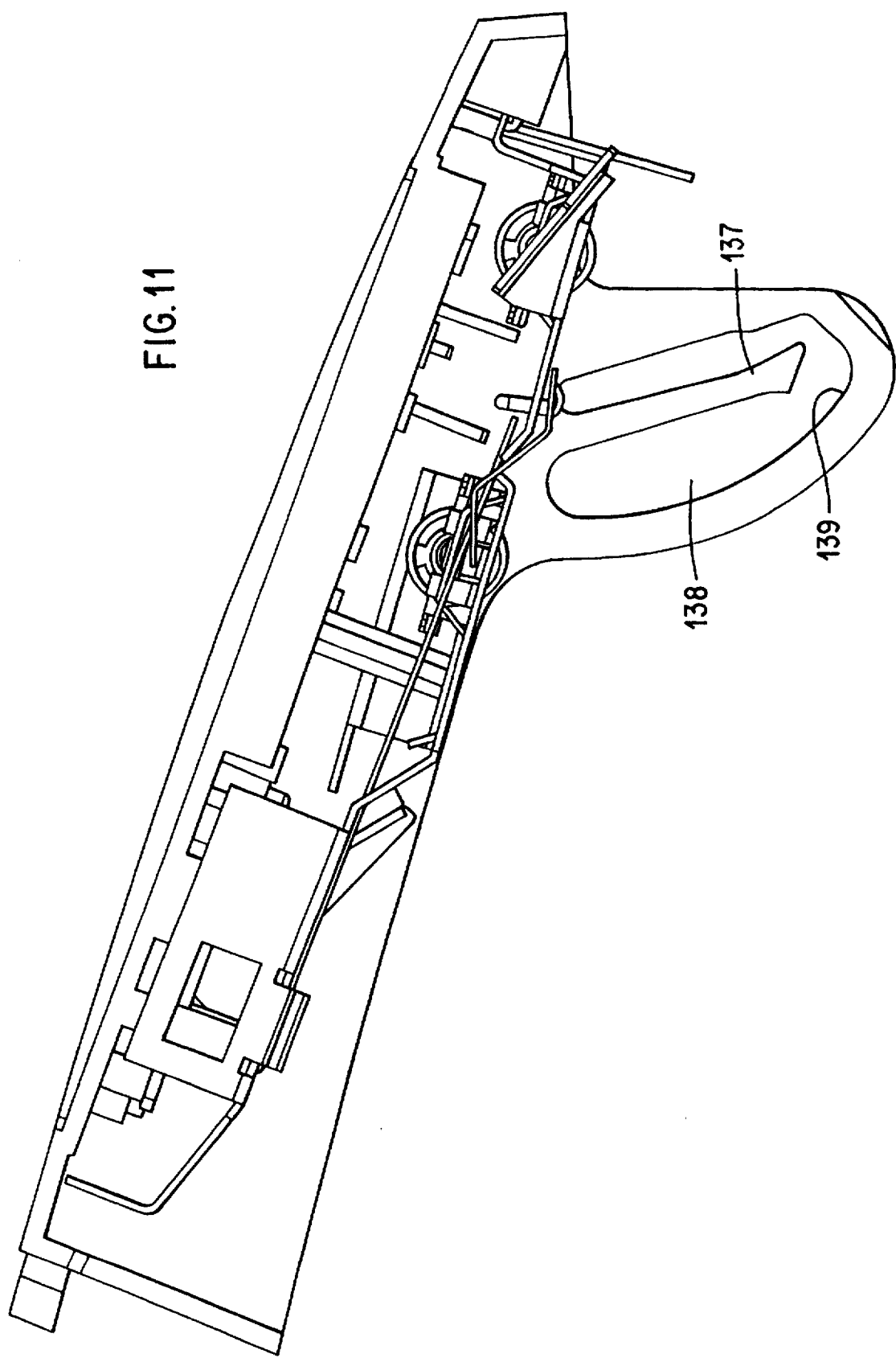
FIG. 11 is a side view of a chassis mounted on an upper guide member having a control/display member.
Figure 12:
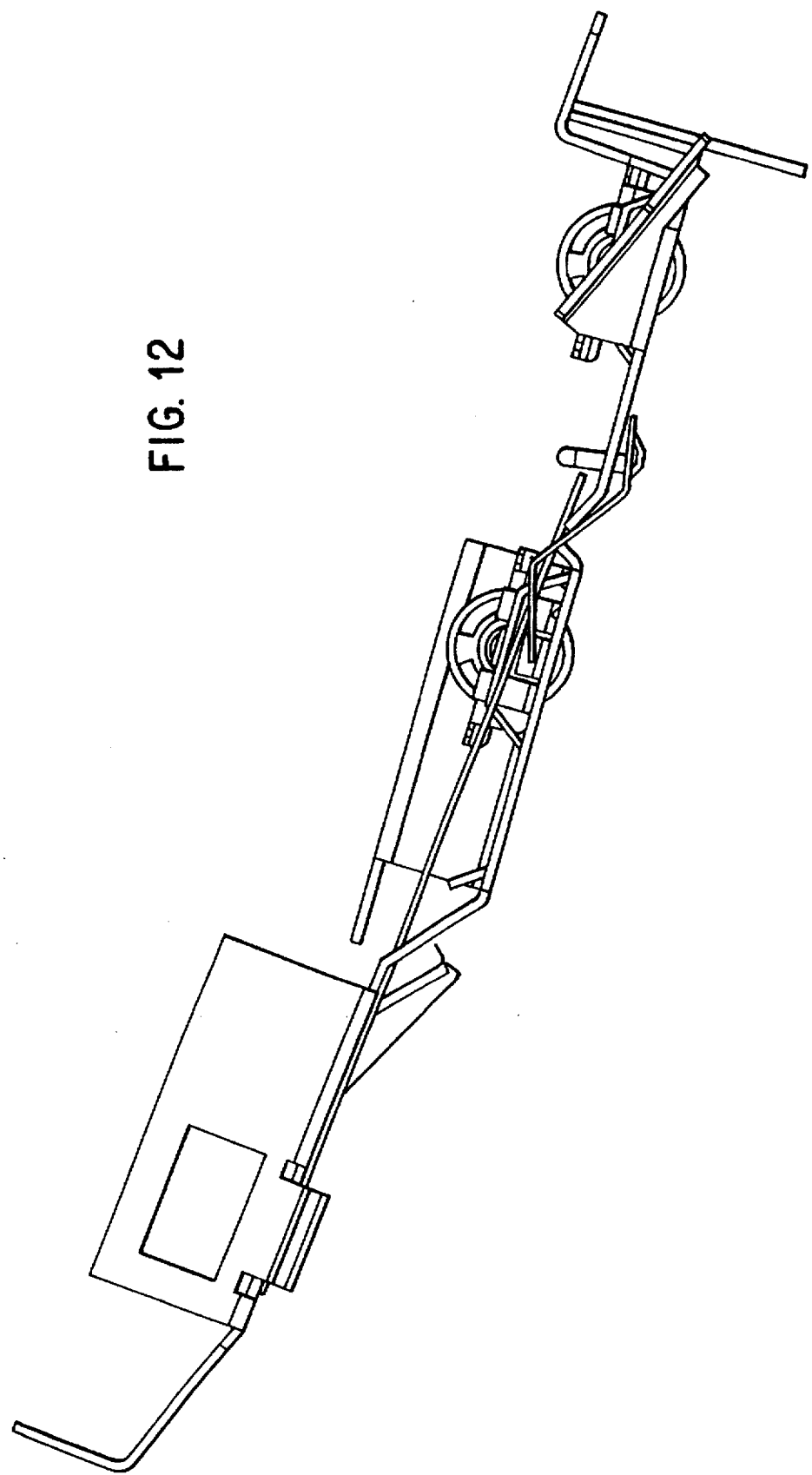
FIG. 12 is a side view of only the chassis portion of FIG. 11.

FIG. 11 shows the chassis mounted on the upper guide member which has a slotted guide 138 with a flex-arm to temporarily hold the upper guide member in open position and a stop 139 to prevent opening the upper guide member too far. FIG. 12 shows the same view of the chassis separate from the upper guide member.

Figure 14:
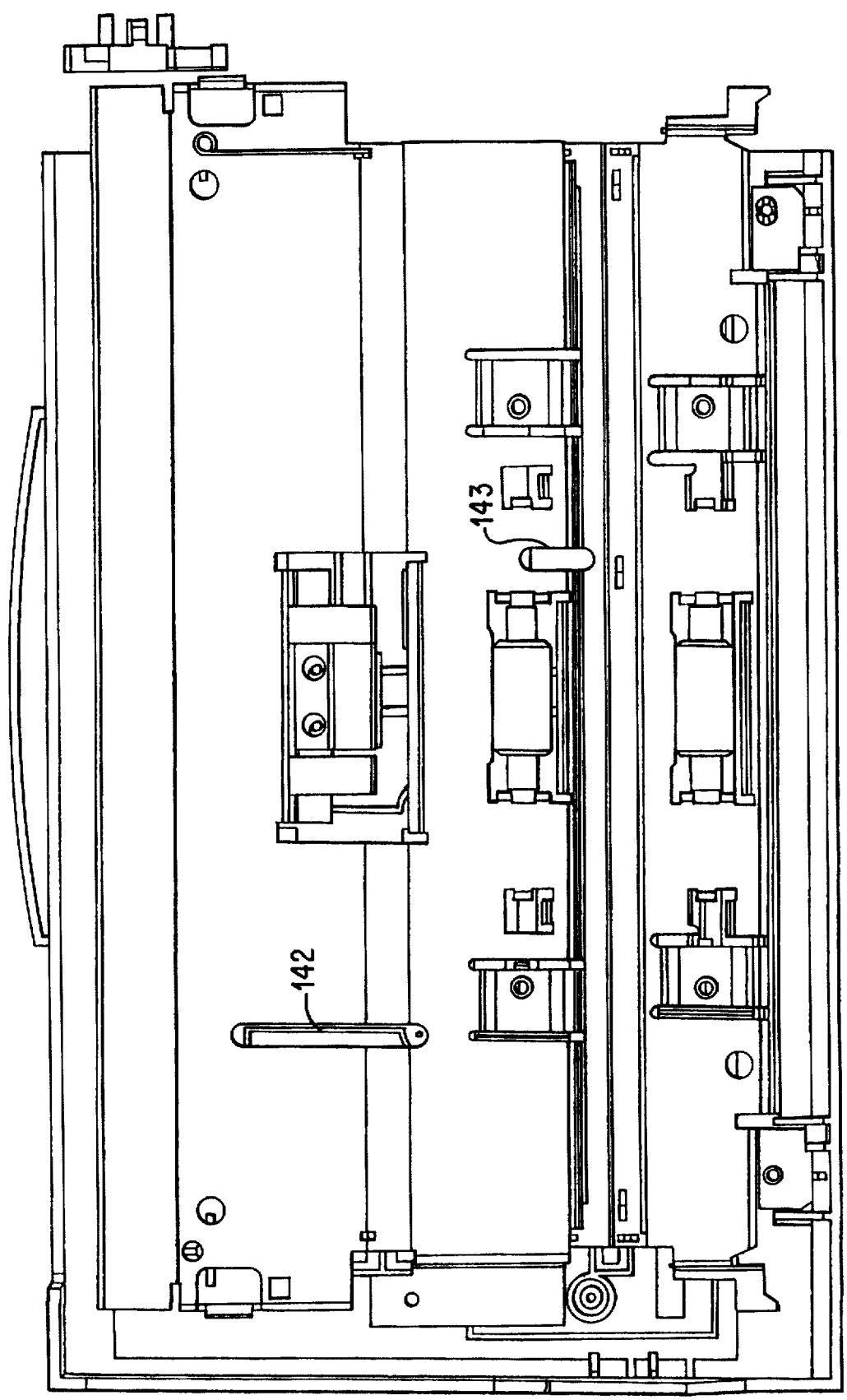
FIG. 14 is a bottom view looking up at a portion of FIG. 11.

FIG. 14 shows the positioning of the separation assembly and the two idler rollers as well as the mounting screw hole 140 for the wire spring. Slots 142/143 are for a first sensor flag to detect documents inserted for scanning, and a second sensor flag to detect a single document sheet which has already been picked and is headed for the scanning window.

Figure 15:
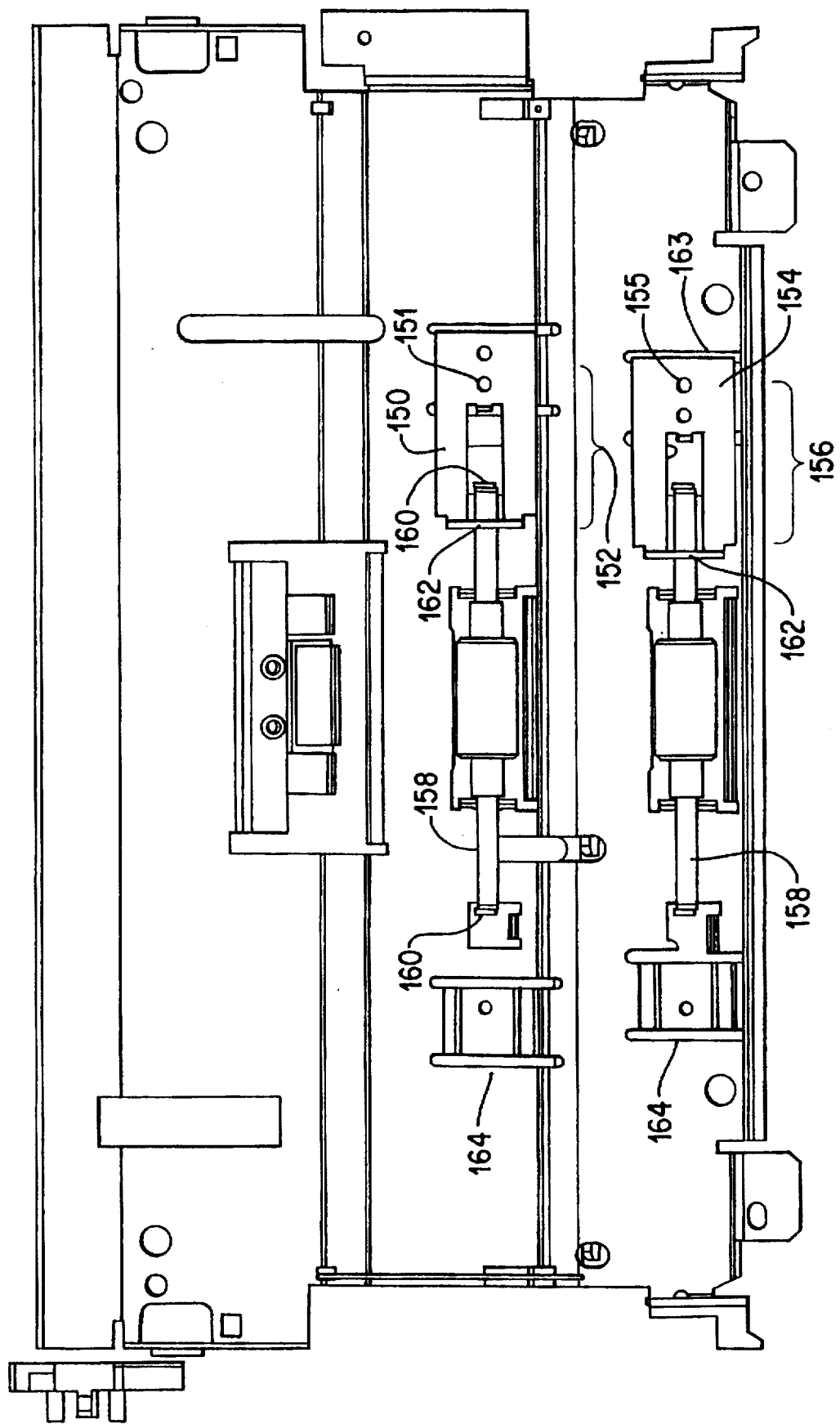
FIG. 15 is a top view of only the chassis portion of FIG. 11, with the separator assembly mounted thereon, and showing the spring-biased mounting of the pre-scanning and post-scanning pinch rollers.

FIG. 15 shows one cantilever leaf spring 150 (its mate is not shown) mounted on a first hole 151 to provide a short cantilever arm 152, and a second identical cantilever leaf spring 154 (its mate is not shown) mounted on a second hole 155 to provide a longer cantilever arm 156. Each idler roller is a hollow hard plastic roller which is mounted on a stationary axle 158 held in lengthwise position by flange brackets 160 and held in Z-axis position by small holes 162 in each of the cantilever leaf springs. The cantilever leaf springs also include a positioning flange for mounting on their upstanding brackets 164.

It will thus be appreciated that the aforementioned description and drawings provide unique advantages and benefits, and that many changes and variations can be made without departing from the spirit and scope of the invention as set forth in the following claims.

We claim as our invention:

1. A scanning unit for feeding a stack of documents, one document sheet at a time, along a document path, comprising:

a frame having a scanner with a scanning window in the document path;

an upper guide member located adjacent to the document path and over said scanning window;

pivot means on said upper guide member and engageable with said frame to allow manual access to the document path when said upper guide member is in an open position;

a driven pick roller on said frame at an entrance to the document path;

driven transport roller means on said frame along the document path and in the vicinity of said scanning window;

motor means on said frame connected to said pick roller and said transport roller means for driving said pick roller and transport roller means;

a document separator located upstream a predetermined distance from and a predetermined location relative to said pick roller;

positioning datums for said document separator to help achieve said predetermined distance and said predetermined location when said upper guide member is in a closed position;

pinch roller means located adjacent to said transport roller means with the document path therebetween;

a limiter member located adjacent to said scanning window with the document path therebetween; and a rigid chassis member on said upper guide member for carrying and incorporating thereon said document separation means, said positioning datums, said pinch roller means, and said limiter member.

2. The scanning unit of claim 1 wherein said rigid chassis member carries and incorporates thereon said pivot means.

3. The scanning unit of claim 1 wherein said rigid chassis member carries and incorporates thereon ESD devices located adjacent the document path.

4. The scanning unit of claim 1 which further includes a latch mechanism for securely positioning said upper guide member against said frame when said upper guide member is in said closed position.

5. The scanning unit of claim 4 wherein said latch mechanism includes a latch arm on said frame and a latch seat which is carried and incorporated on said rigid chassis member.

6. The scanning unit of claim 1 wherein said upper guide member includes a manual control/display panel with a circuit board.

7. The scanning unit of claim 6 wherein said rigid chassis member includes an enlarged metallic plate which attaches to the underside of said manual control/display panel with said circuit board sandwiched therebetween.

8. The scanning unit of claim 7 wherein said enlarged metallic plate is electrically grounded and provides an ESD shield for said circuit board and ESD grounding for said control/display panel.

9. The scanning unit of claim 1 wherein said driven transport roller means includes a pre-scanning drive roller before said scanning window and a post-scanning drive roller after said scanning window, and wherein said pinch roller means includes a first idler roller opposite said pre-scanning drive roller and a second idler roller opposite said post-scanning drive roller.

10. The scanning unit of claim 9 wherein said motor means includes a single motor on said frame, and further including gear means between said single motor on one hand and said pick roller, said pre-scanning roller and said post-scanning roller on the other hand, for driving said rollers at predetermined rates of speed.

11. The scanning unit of claim 10 wherein said pick roller is driven at a first media transport speed, said pre-scanning roller is driven at a second media transport speed, and said post-scanning roller is driven at a third media transport speed, with said first speed being less than from said second and third speeds.

12. The scanning unit of claim 11 wherein said third media transport speed is greater than said second media transport speed.

13. The scanning unit of claim 10 wherein said pick roller is made of a first rubber or rubber-like material and said pre-scanning roller is made of a second rubber-like material and said post-scanning roller is made of a third rubber or rubber-like material, with said first rubber or rubber-like material being softer than said second and third rubber-like materials.

14. The scanning unit of claim 1 wherein said driven transport roller means is spring loaded to provide a predetermined spring bias against a document sheet being transported along the document path.

15. The scanning unit of claim 1 wherein said limiter member is spring loaded to provide a spring bias against a document being transported across said scanning window.

16. A facsimile device having a scanning unit for feeding and transporting a stack of documents, one document sheet at a time, along a document path, comprising:

a frame having a scanner with a scanning window in the document path;

an upper guide member located adjacent to the document path and over said scanning window;

pivot means on said upper guide member and engageable with said frame to allow manual access to the document path when said upper guide member is in an open position;

a driven pick roller on said frame at an entrance to the document path;

driven transport roller means on said frame along the document path and in the vicinity of said scanning window;

motor means on said frame connected to said pick roller and said transport roller means for driving said pick roller and transport roller means;

a document separator located upstream a predetermined distance from and a predetermined location relative to said pick roller;

positioning datums for said document separator to help achieve said predetermined distance and said predetermined location when said upper guide member is in a closed position;

spring-biased pinch roller means located adjacent to said transport roller means with the document path therebetween;

a spring-biased limiter member located adjacent to said scanning window with the document path therebetween; and a rigid chassis member on said upper guide member for carrying and incorporating thereon said document separation means, said positioning datums, said pinch roller means, and said limiter member.

17. The facsimile device of claim 16 wherein said rigid chassis member carries and incorporates thereon said pivot means; and wherein said rigid chassis member includes ESD devices; and wherein said pivot means provides electrical grounding for said ESD devices.

18. The facsimile device of claim 16 which further includes a latch mechanism for securely positioning said upper guide member against said frame when said upper guide member is in said closed position, said latch mechanism being located adjacent to said positioning datums.

19. A method of mounting document feeder and transport components in a facsimile device which transports individual sheets of documents along a document path past a scanning window, comprising the following steps:

providing a pick roller on a frame in advance of the scanning window;

picking a document sheet from a stack;

providing a transport roller on the frame;

transporting the document sheet past a scanning window;

scanning information from the document sheet during said transporting step;

providing a rigid chassis which defines an upper guide for the document path;

using position datums and a latching surface in close proximity to each other on said rigid chassis for interacting with matching position datums and a matching latching surface on the frame to help said picking step to be successful;

holding the document sheet against the transport roller with a first spring biased element during said transporting step to help said transporting step to be successful; and holding the document sheet in position adjacent the scanning window with a second spring biased element during said transporting step to help said scanning step to be successful.

20. The method of claim 19 wherein said picking step moves the document sheet at a first transport speed, and said transporting step moves the document sheet at a second transport speed, with the second transport speed being faster than the first transport speed.

* * * * *